United States Patent [19]

Early et al.

[11] 4,339,632
[45] Jul. 13, 1982

[54] BUTTON ILLUMINATION FOR REPERTORY DIALER WITH LOW BATTERY VOLTAGE INDICATION

[75] Inventors: Scott H. Early; David M. Savidge, both of Indianapolis, Ind.

[73] Assignee: Bell Telephone Laboratories, Incorporated, Murray Hill, N.J.

[21] Appl. No.: 210,673

[22] Filed: Nov. 26, 1980

[51] Int. Cl.³ .................... H04M 1/274; H04M 1/02
[52] U.S. Cl. .......................... 179/90 B; 179/90 AN; 179/81 C; 179/84 L; 179/2 BC; 200/310; 200/314; 340/636; 340/365 R
[58] Field of Search .......... 179/90 B, 90 BD, 90 BB, 179/90 K, 90 AN, 90 AD, 81 C, 84 L, 2 BC; 340/636, 365 R; 200/310, 313, 314

[56] References Cited

U.S. PATENT DOCUMENTS

| | | | |
|---|---|---|---|
| 2,437,555 | 3/1948 | Rees | 200/314 |
| 3,132,211 | 5/1964 | Bauman | 179/84 L |
| 3,670,111 | 6/1972 | Burosky et al. | 179/90 B |
| 3,784,760 | 1/1974 | Rickert | 179/90 B |
| 4,019,112 | 4/1977 | Satoh | 340/636 |
| 4,027,231 | 5/1977 | Lohrmann | 340/636 |
| 4,056,701 | 11/1977 | Weber | 340/365 R |

FOREIGN PATENT DOCUMENTS 54-152803 12/1979 Japan ................. 179/81 C

Primary Examiner—Gerald L. Brigance
Attorney, Agent, or Firm—S. R. Williamson

[57] ABSTRACT

A display illuminating circuit for a repertory dialer telephone set allows for a subscriber to operate a desired repertory button in low ambient light emergency situations. The circuit illuminates the desired buttons by distinguishable colors of light-emitting elements. Activation of the illumination circuit occurs in response to the telephone set going off-hook and then only for a limited period to conserve battery life. A battery voltage monitoring arrangement provides an indication when a local battery needs to be replaced. In response to an activation signal provided by the voltage monitoring arrangement, the light-emitting elements flash at a level that is detectable by the subscriber going off-hook even in normal ambient light conditions.

8 Claims, 2 Drawing Figures

BUTTON ILLUMINATION FOR REPERTORY DIALER WITH LOW BATTERY VOLTAGE INDICATION

BACKGROUND OF THE INVENTION

1. Technical Field

This invention relates to the illumination of telephone sets and, more particularly, to illumination of repertory dialer telephone sets.

2. Description of the Prior Art

A variety of means are known in the prior art that furnish illumination for telephone sets. Illuminating buttons on a multibutton set are used to identify a particular line selected when a person goes off-hook, for example, by lifting the handset from its mounting. Similarly, illuminating buttons are also used on multiline telephone sets to aid in identifying the particular line having an incoming call thereupon.

In repertory dialer telephone sets where a call is made by depressing a single button to initiate the transmission of digits corresponding to a recorded directory number, it is known to have recorded memory associated with buttons of a distinctive color and/or to have a name such as police, fire, or doctor written alongside the buttons for rapid association and dialing. One typical arrangement is shown in U.S. Pat. No. 3,670,111, issued to A. A. Bukosey et al. on June 13, 1972. While such arrangements have been found satisfactory where there is sufficient ambient light, they do not facilitate rapid dialing in low ambient light emergency situations.

SUMMARY OF THE INVENTION

In accordance with the present invention, a repertory dialer telephone set has a display illuminating means for identifying a preferred one of multiple repertory buttons in low ambient light conditions. A subscriber can thereby identify and operate the repertory button in emergency situations. For multiple preferred repertory buttons, a distinctive illuminating color is associated with each preferred button. Activation of the display illuminating means is arranged to occur only in response to the telephone set being placed in the off-hook condition. The display illuminating means remains activated for a preselected time interval sufficient to permit the subscriber to locate the desired button and initiate a call.

To ensure that sufficient power is available for operation of the display illuminating means, a local battery voltage monitoring arrangement provides an indication when the battery needs to be replaced. A subscriber is alerted to this condition by the display illuminating means causing the preferred one or ones of the repertory buttons to alternate in brightness repeatedly between a low illumination level and a high illumination level during the preselected time interval.

DETAILED DESCRIPTION

Figure 1:
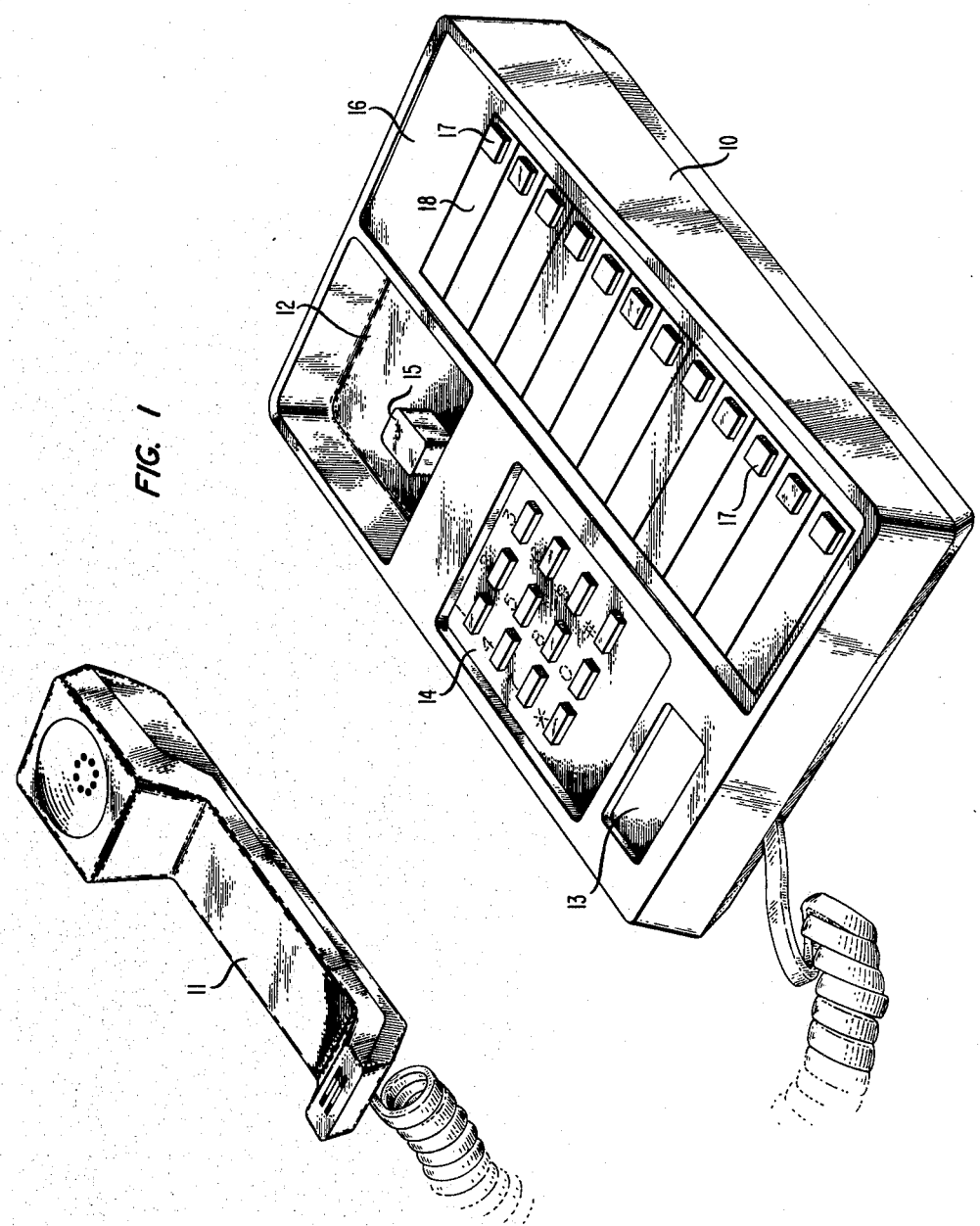
FIG. 1 is a perspective view of a repertory telephone set incorporating the display illuminating arrangement of the present invention.

Referring now to FIG. 1 of the drawing, there is shown a repertory dialer telephone set incorporating an illuminating arrangement of the display illuminating means in accordance with the present invention. The telephone set comprises a base 10 and a handset 11, the handset when not in use being placed in mounting slots 12 and 13 that are respectively disposed above and below a pushbutton dial keypad 14 on the face of the set. In the slot 12 is the switchhook mechanism 15 of the telephone set, the switchhook mechanism 15 being depressed downward when the handset 11 is placed in slot 12 and moves upward when the handset 11 is removed therefrom.

The base 10 includes an inclined faceplate 16 upon which elements of the repertory dialer are located. Among these elements is a column of twelve pushbuttons 17, each pushbutton having associated alongside therewith a window in which a tab 18 is visible. The faceplate 16 is removable to provide access to the tabs 18 to permit the recording of the name of an individual subscriber on each tab. Each pushbutton 17 is employed in the automatic transmission of a plurality of digits prerecorded in memory within the telephone set to establish connection with the subscriber whose name appears on the tab 18 adjacent to the pushbutton. A select number of the pushbuttons 17 are equipped with light-emitting elements for rapid identification in low ambient light emergency situations.

Figure 2:
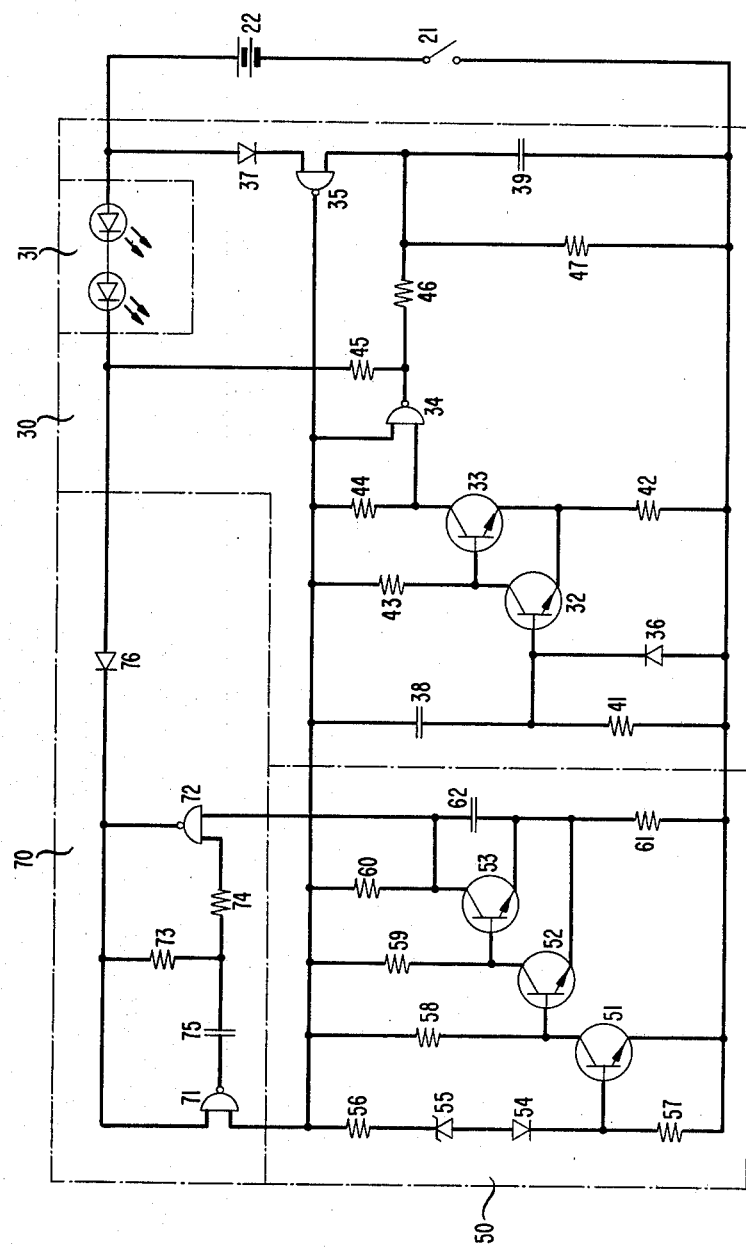
FIG. 2 is a schematic circuit diagram of the display illuminating arrangement employed in this invention.

With reference to FIG. 2, there is shown a schematic circuit diagram of the illuminating arrangement of FIG. 1. It is divided into three identifiable circuit sections which are a button illumination and timer section 30, a low battery voltage indication section 50, and an oscillator section 70.

Contained in the button illumination and timer circuit section 30 is a light-emitting diode (LED) string 31, each diode in the string being associated with one of the preferred repertory pushbuttons 17 as a light-emitting element. Also included in this section are transistors 32 and 33, NAND gates 34 and 35, diodes 36 and 37, capacitors 38 and 39, and resistors 41 through 47. For low power operation and for operation over a range of battery supply voltages, the NAND gates described in this section as well as the gates described hereinafter are complementary metal oxide semiconductor (CMOS) logic gates.

In the quiescent state, the handset 11 is in the on-hook position and a switchhook contact 21 associated with the switchhook mechanism 15 is open. No operating power is supplied by a battery 22 to the circuit section and both capacitors 38 and 39 are discharged. When the handset goes to the off-hook position as is depicted in FIG. 1, the switchhook contact 21 closes and power is provided to the circuit section through diode 37. Operating power for all the CMOS logic gates is also provided at this time through diode 37.

With the application of power, a first input of two-input NAND gate 35, which is connected to diode 37, goes to a logic one. At this time, the second input of NAND gate 35 is being held low by capacitor 39 which is discharged. These input logic states cause the output of NAND gate 35 and therefore both inputs of two-input NAND gate 34 to go to a logic one as the power from the battery 22 brings the logic up to its operate level. With both inputs high, the output of NAND gate 34 goes to a logic zero and turns the LED string 31 ON. Also at this time, capacitor 38, having the logic one from the output of NAND gate 35 impressed thereupon, begins to charge through resistor 41 and, via the base-emitter junction of transistor 32, resistor 42. In that resistor 41 is much larger in value than resistor 42, the major part of the charging current passes through resistor 42.

A Schmitt trigger, formed by transistors 32 and 33 and resistors 41 through 44, comes ON with the application of the battery voltage such that transistor 32 is saturated in the ON state and transistor 33 is turned OFF. As capacitor 38 charges, the voltage across resistor 41 decreases and eventually causes transistor 32 to turn OFF. This, in turn, causes transistor 33 to rapidly turn ON. When transistor 33 turns ON, its collector, which is coupled to one of the two inputs of NAND gate 34, goes to a logic zero. With this change, the output of NAND gate 34 then goes to a logic one and the LED string 31 turns OFF ending the preselected display time interval.

The logic one output of NAND gate 34 is also coupled via resistor 46 to the second input of NAND gate 35 and to capacitor 39 which begins to charge to the logic one potential. Once capacitor 39 charges above the threshold switching level of NAND gate 35, the output of NAND gate 35 goes to a logic zero and capacitor 38 then begins to discharge back through NAND gate 35. This discharge time is very short since the output conductance of NAND gate 35 is on the order of a few hundred ohms. Thus, the timing circuitry is reset almost immediately after the LEDs are turned OFF.

If the switchhook mechanism 15 is depressed before the preselected time interval has elapsed, capacitor 38 is discharged through the internal MOS transistors (not shown) that make up NAND gates 34 and 35, the main discharge path being through the N-channel transistors of NAND gate 35. The discharge time is short enough such that the circuitry will be reset any time the switchhook mechanism 15 is flashed long enough to drop the central office connection.

The low battery voltage indication circuit section 50 comprises transistors 51 through 53, diodes 54 and 55, resistors 56 through 61, and capacitor 62. Operating power is supplied to the voltage indication circuit section 50 from the logic one voltage level at the output of NAND gate 35. Thus, this circuit section is powered ON and the battery voltage is monitored only during the established ON time interval of the button illumination and timer circuit section 30.

The voltage signaling level of the low battery voltage indication circuit section 50 is determined by the zener diode 55. While the battery voltage is higher than both the zener diode turn ON voltage and the diode voltage drop of diode 54, transistor 51 is turned ON holding transistor 52 in the OFF state. Transistor 52 is similarly holding transistor 53 in the ON state. As the battery voltage decreases with time and set usage, transistor 51 becomes less forward-biased and transistor 52 less reverse-biased. As the battery voltage reaches the level where the zener action in diode 55 can no longer be sustained, the base current to transistor 51 ceases and transistor 51 turns OFF. This, in turn, causes transistor 52 to turn ON and transistor 53 to turn OFF. Thus, an activation signal from the collector of transistor 53 is provided whenever the voltage of battery 22 decreases to below a desirable level.

To provide a positive alerting signal as to the status of the battery, the oscillator circuit section 70, which comprises NAND gates 71 and 72, resistors 73 and 74, a capacitor 75, and a diode 76, is utilized. Basically an astable multivibrator, the oscillator circuit section 70 causes the LED string 31 in the button illuminating and timer circuit section 30 to alternate in brightness between a low illumination level and a high illumination level within the established ON time interval of the button illumination and timer circuit section, thereby alerting the subscriber that the battery has a voltage level below that desired and should be replaced.

Prior to the established ON time interval of the button illumination and timer circuit section 30, one of the two inputs to NAND gate 71 is held low by the output of NAND gate 35. As the button illumination and timer circuit section 30 turns ON with the application of power from the battery 22, a logic one is presented to this input allowing the output of NAND gate 71 to go to a logic zero.

During the established ON time interval of the button illumination and timer circuit section 30, the oscillator circuit section 70 is prevented from oscillating as long as the battery voltage is at a sufficient level. This control is achieved by coupling the output of transistor 53 in the low battery voltage indication circuit section 50 to one of the two inputs of NAND gate 72 in the oscillator circuit section 70. As earlier indicated, transistor 53 turns OFF and provides an activation signal when the battery voltage decreases to the signaling level of the low battery voltage indication circuit section 50. This, in turn, causes a logic one output to be provided to one of the two inputs of NAND gate 72 allowing its output to go to a logic zero. NAND gate 72 is thereby free to change its output state along with NAND gate 71 and thus the circuit commences oscillation. The oscillator frequency is controlled by the R-C time constant of the capacitor 75 and resistor 73 for a first order approximation.

For modulation of its illumination level, the LED string 31 has the oscillator output from NAND gate 72 coupled thereto through the diode 76. As the output of NAND gate 72 alternates between a logic one and a logic zero at the frequency of the oscillator, diode 76 is alternately reversed-biased and forward-biased, respectively. While the diode 76 is reverse-biased, the logic one output potential of NAND gate 72 is greater than that at the cathode side of the LED string 31 since at this time NAND gate 34 has a logic zero at its output and is operating as a current sink for the LED string 31 via resistor 45. Thus in this state, the LED string 31 will be ON as normal in the low intensity level that is visible in low ambient light conditions.

As the output of NAND gate 72 changes to a logic zero, the diode 76 becomes forward-biased. This creates for the LED string 31 a second current path through diode 76 and the output of NAND gate 72 that is parallel to the current path through resistor 45 and the output of NAND gate 34. This second current path, however, will allow more current to flow through the LED string 31 and is limited only by the ability of NAND gate 72 to sink the current from the LED string 31. This increases the illumination level of the LED string 31 such that operation at this high illumination level, with NAND gate 72 sinking current, the diodes are visible in normal ambient light conditions. Thus by flashing the diodes at this increased level, a subscriber will be alerted even under normal daylight conditions that the battery 22 is weak and should be replaced.

Although a specific arrangement of the invention has been shown and described, it will be understood that it is but illustrative and that various modifications may be made therein without departing from the spirit and scope of this invention as defined in the appended claims.

We claim:

1. In a telephone set having a plurality of buttons, each button representing a plurality of digits precorded in a memory within the telephone set, a display circuit means comprising light-emitting elements, each element being associated wih one of selected buttons within the plurality of buttons for identification of buttons representing a preferred plurality of digits recorded in memory, and each one of the selected buttons having associated therewith a light-emitting element of a distinctive color, the display circuit means further including both battery supply means for powering the display circuit means, and circuit-connecting means responsive to the operation of a switch for applying power from the battery supply means to the display circuit means, and the light-emitting elements being arranged to provide a low battery indication when the potential of the battery supply means goes below a predetermined level.

2. The display circuit means as in claim 1 wherein the circuit-connecting means activates the display circuit means for a fixed time period and after this time period the circuit-connecting means deactivates the display circuit means, the display circuit means being activated each time the switch is operated, the circuit-connecting means including a first and a second logic gate, the first logic gate, in response to the operation of the switch, providing an activation signal to the second logic gate, the second logic gate being connected to the light-emitting elements and providing a current sink for the activation thereof.

3. The display circuit means as in claim 2 wherein the circuit-connecting means further comprises two transistors, the first transistor providing reference current for the second transistor and being activated ON in response to the activation signal from the first logic gate, the activation signal also providing a voltage potential for charging a capacitor arranged in combination with a resistor for determining the fixed time period, the second transistor operatively responsive to the first transistor and providing an output signal to the second logic gate for deactivation of the light-emitting elements at the end of the fixed time period.

4. The display circuit means as in claim 3 further comprising a low battery indication circuit, the indicating circuit including three transistors, the first transistor providing reference current for the second transistor and the second transistor providing reference current for the third transistor, the first transistor having a zener diode across its gate input for providing an activation signal when the potential of the battery supply means decreases to below the zener operate voltage of the diode, and the third transistor providing an output signal indication reflecting this decrease.

5. The display circuit means as in claim 1 wherein the light-emitting elements are intensity modulated by alternating between a low and a high intensity level in response to activation of the circuit-connecting means and the potential of the battery supply means going below a predetermined level.

6. The display circuit means in claim 5 further comprising an oscillator circuit for intensity modulating the light-emitting elements.

7. The display circuit means in claim 6 wherein the oscillator circuit comprises two logic gates, the first logic gate being operatively responsive to activation of the circuit-connecting means and the second logic gate being operatively responsive to the potential of the battery supply means going below the predetermined level.

8. In a telephone set having a plurality of buttons, each button representing a plurality of digits prerecorded in a memory within the telephone set, a display circuit means comprising light-emitting elements, each element being associated with one of selected buttons within the plurality of buttons for identification of buttons representing a preferred plurality of digits recorded in memory;

battery supply means for powering the display circuit means, and circuit-connecting means responsive to the operation of a switch for applying power from the battery supply means to the display circuit means, the circuit-connecting means activating the display circuit means for a fixed time period and after this time period the circuit-connecting means deactivating the display circuit means, the display circuit means being activated each time the switch is operated, and the light-emitting elements being intensity modulated by alternating between a low and a high intensity level in response to activation of the circuit-connecting means and the potential of the battery supply means going below a predetermined level.

* * * * *